United States Patent [19]
Foster et al.
[11] 3,775,999
[45] Dec. 4, 1973

[54] METHOD OF SEALING ELECTRODES TO GLASS WITH A GLASS FRIT

[75] Inventors: Betty J. Foster; Rao R. Tummala, both of Wappingers Falls, N.Y.

[73] Assignee: International Business Machines Corporation, Armonk, N.Y.

[22] Filed: June 8, 1972

[21] Appl. No.: 260,788

[52] U.S. Cl. .............................. 65/50, 65/59, 65/60
[51] Int. Cl. .............................................. C03c 17/04
[58] Field of Search ...................... 65/32, 60, 50, 59

[56] References Cited

UNITED STATES PATENTS

| | | | |
|---|---|---|---|
| 3,166,396 | 1/1965 | Miller et al. | 65/32 |
| 3,275,470 | 9/1966 | Charles | 65/32 X |
| 3,526,550 | 9/1970 | Larson et al. | 65/59 X |

*Primary Examiner*—Arthur D. Kellogg
*Attorney*—Henry E. Otto, Jr. et al.

[57] ABSTRACT

A method of making a gaseous discharge display and/or memory device in which no separate passivation step is required to protect the electrical conductors formed on a glass substrate. After a dielectric glass frit slurry is sprayed over the conductors and dried, the assemblage is fired in an oven to cause the dielectric to reflow and, when later cooled, to provide a smooth protective dielectric layer over the conductors. Applicants found that firing in a very wet atmosphere with neutral or oxidizing ambients causes the dielectric to reflow at a substantially lower temperature than it would in a similar but dry atmosphere. This desirably permits dielectrics of higher viscosity and consequently higher softening temperatures to now be used because the requisite firing temperature is reduced in the wet atmosphere. High viscosity dielectrics are preferred to minimize crazing of the magnisium oxide coating that is currently placed over the dielectric coating after the dielectric-substrate is cooled. Except for this reduction in firing temperature, these high viscosity dielectircs would have to be fired at temperatures over 600° C., which undesirably causes warping of the soda-lime silica glass substrates currently available.

11 Claims, 5 Drawing Figures 104
106
100
102
OVEN
103
105
109
12
13
101

METHOD OF SEALING ELECTRODES TO GLASS WITH A GLASS FRIT

CROSS REFERENCE TO RELATED APPLICATIONS

U.S. patent application of Thomas J. Murphy et al. (Ki971017), Ser. No. 214,151, filed Dec. 30, 1971, entitled "Improved Method of Gas Panel Construction"; U.S. patent application of Peter H. Haberland et al. (Ki971008), Ser. No. 176,626, filed Aug. 31, 1971, entitled "Improved Dielectric Insulator for Gaseous Discharge Device"; and U.S. patent application of M. J. Costa et al. (Ki971022), Ser. No. 251,483, filed May 8, 1972, entitled "Gaseous Discharge Display Device and Method of Spacing the Plates Thereof."

The above three applications are assigned to the assignee of the present invention.

BACKGROUND OF THE INVENTION

This invention relates to methods of making gaseous discharge display and/or memory devices, and more particularly to such processes wherein the dielectric is fired in a wet atmosphere to cause it to fire and reflow at lower temperatures for achieving a variety of desirable results.

It has heretofore been proposed (e.g., in the above-identified Murphy et al. application) to make gaseous discharge devices by depositing on a soda-lime-silica glass substrate successive layers of chrome, copper, and then and overlayer of chrome; etching an array of parallel laminated conductors therein; then heating the assemblage in a forming gas atmosphere to form a layer of chromium oxide on the exposed chromium layer to render the conductors passivated or nonreactive to attack during subsequent high temperature dielectric glassing operations. Thereafter a slurry of finely ground glass frit was sprayed over the conductors, then dried, and next fired in an oven to reflow the glass frit to form a protective dielectric glass coating of uniform depth over all conductors; whereupon the assemblage was cooled. A magnesium oxide coating was then deposited over the dielectric in a vacuum environment to improve the life of the lead glass used for the dielectric and also enable operation of the panel at a lower voltage (possible because of the high secondary emission coefficient of magnesium oxide). A pair of magnesium-oxide-coated plates were then fused into an integrated structure with the conductor arrays on the respective plates orthogonally disposed at a preselected precise distance. The arrays (except for projecting lead portions) were surrounded by a border of sealing material that fired at a relatively low temperature (below that of the dielectric) causing the upper of the two plates to settle and come to rest at said preselected distance from the lower of the plates as controlled by high-softening-point spacer rods or the like. When the assemblage was cooled, the sealing rods flowed and fused to the plates, creating a chamber of precise constant gap into which an illuminable gas was later introduced and sealed.

The soda-lime-silica glass substrates currently available warp at temperatures above about 600° C. Also it has been found that the magnesium oxide coating tends to craze during the sealing operation as the plates are brought up to the temperature of about 460°–480° C., at which the sealing material fires. This crazing normally starts to occur at temperatures above about 435° C., corresponding to a dielectric glass viscosity of $10^{10.3}$ poises; but the temperature at which crazing commences can be raised as the viscosity of the dielectric glass is increased. Unfortunately, however, as the viscosity of the glass increases, its firing temperature increases. This, in turn, results in the glass substrate problems described above. Hence, the ideal situation is to use a dielectric glass of maximum viscosity which will not warp the substrate, and also provide a sealing material that will reflow at temperatures significantly below the crazing temperature.

It would also be desirable, if possible, to eliminate the special passivation step which applies a protective coating over the conductors before the glass frit dielectric slurry is sprayed. This would effect a significant saving in time, equipment and supervision, as well as variability in the passivation process, since the heating and cooling of the substrate and their conductors would then be eliminated. It would also be desirable, if possible, to eliminate the top layer of chrome over the copper layer. (The layer of chrome under the copper is necessary to effectively bond the copper to the substrate, as direct bonding of copper to glass is not possible.)

SUMMARY OF THE INVENTION

Toward this end, and according to the invention, applicants have found that, under various conditions, some or all of these objectives can be achieved by firing the dielectric glass frit and reflowing it in a wet atmosphere, preferably with oxidizing or neutral ambients and devoid of reducing ambients like hydrogen because the dielectric glass (usually a lead glass) gets reduced in reducing ambients. As the ambients become progressively more oxidizing (e.g., going from a neutral nitrogen or argon, through compressed air to pure oxygen), the firing temperatures of lead-oxide-boron-oxide-silicon-oxide type glasses will progressively be reduced for any given glass of this type; i.e., a given dielectric glass of this type will fire at a temperature from 20° C. to over 50° below that at which it would soften in an identical but dry atmosphere, with the differential becoming greatest as the ambients become more oxidizing. As a result, a dielectric glass having a high viscosity and a drying temperature in a dry atmosphere exceeding the warping temperature of the glass substrate can now be fired at a significantly lower temperature in a wet atmosphere because in the wet atmosphere it will fire at such lower temperature. Thus warping of the substrate is avoided and crazing of the magnesium oxide coating is minimized or eliminated, the magnesium oxide crazing temperature for the high-viscosity dielectric having been raised to such an extent that crazing does not occur with the sealing glasses currently available or the sealing operation herein described. With the higher viscosity dielectric, the magnesium oxide will not craze until the temperature during the sealing operation reaches almost 490° C.; this, in turn, desirably enables use of a sealing material that fires below the magnesium oxide crazing temperature, somewhat above the 435° C. minimum. Firing the dielectric in the wet atmosphere has been found to permit elimination of the top chromium layer on the conductors, because wetting angles substantially as good or even better than for chrome-copper-chrome conductors were observed on chrome-copper films fired in wet atmospheres devoid of reducing ambients and without the expensive passivation preconditioning step. In other words, the passivation preconditioning step may be eliminated.

Other objects and advantages will become apparent from the following more detailed description of the invention and from the accompanying drawings.

DESCRIPTION OF THE PREFERRED EMBODIMENT

Figure 1:
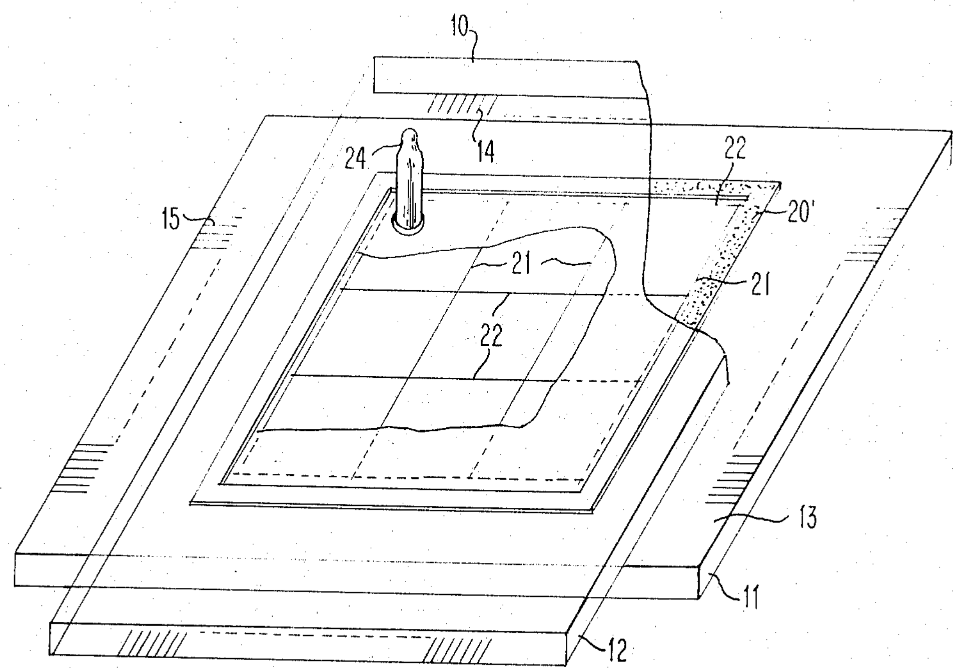
FIG. 1 is a schematic perspective view, partly broken away, of a gaseous discharge display device constructed in accordance with the method embodying the invention.
Figure 2:
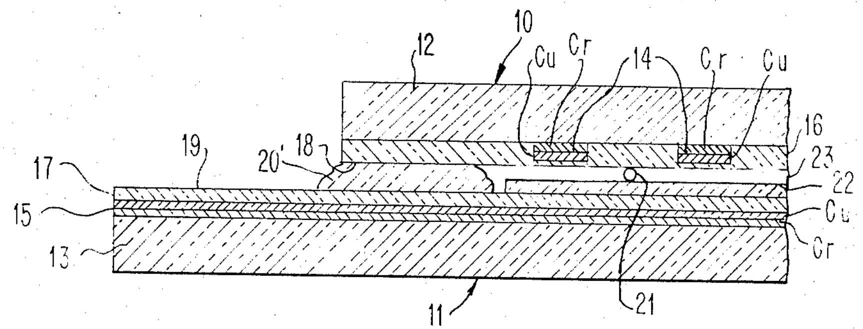
FIG. 2 is a fragmentary vertical sectional view, to substantially enlarged scale, of the device shown in FIG. 1.
Figure 3:
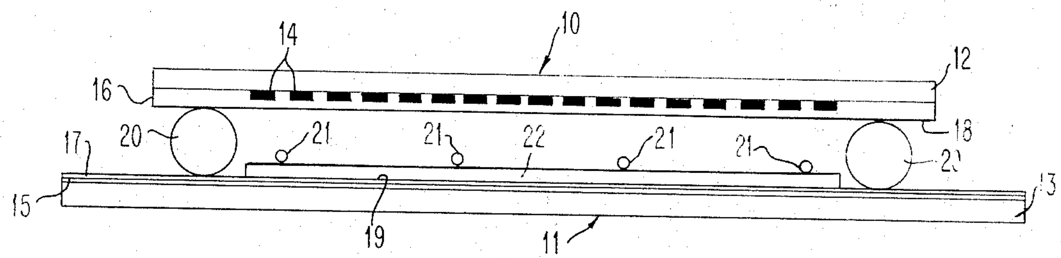
FIG. 3 is a sectional view, to somewhat exaggerated scale, showing the assemblage before a heat fusion step that results in the configuration shown in FIG. 2.
Figure 4:
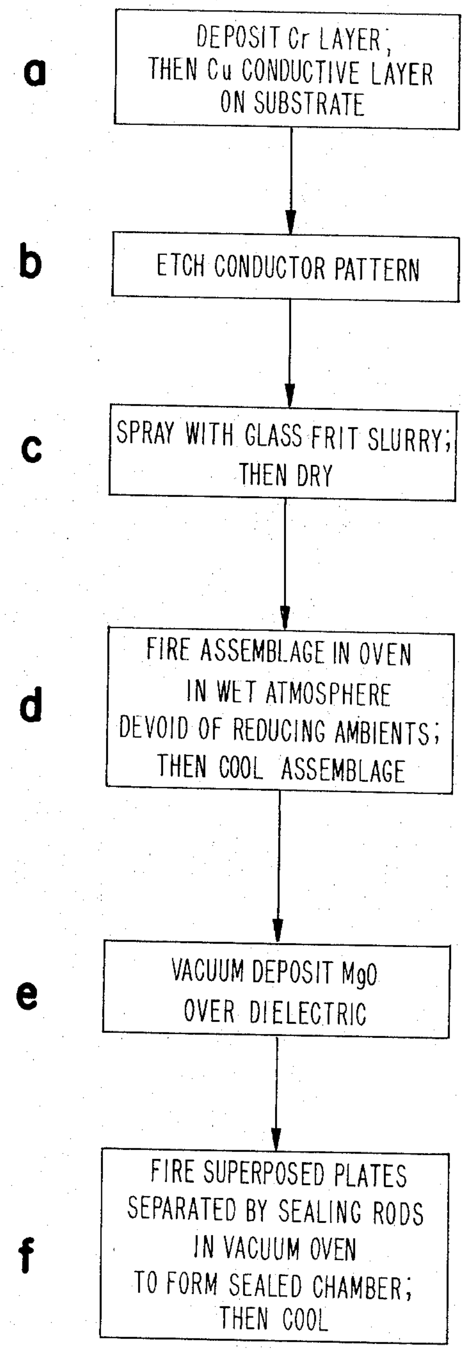
FIG. 4 is a flow diagram depicting the sequence of steps in the method embodying the invention.

There is illustrated in FIGS. 1–3, a gaseous discharge display and/or memory device constructed according to the method embodying the invention and depicted in FIG. 4. This device comprises, briefly, an upper glass plate 10 and a lower glass plate 11, each including substrates 12,13, respectively, on the facing surfaces of which are formed metalized conductor arrays 14,15, respectively. As illustrated, each array 14,15 comprises a thin layer Cr of chrome deposited on the substrate 12,13, respectively, and overlaid with a thin layer Cu of copper (see FIG. **4*a*); these superposed layers have been etched away (see FIG. 4*b*) as necessary to create respective pluralities of parallel conductors. The conductors of array 14 are disposed orthogonally relative to those of array 15; and the ends of the array on each plate extend beyond the edges of the other plate to facilitate connection to alternate conductors of the array, in conventional manner. As best shown in FIGS. 2,3, the chrome-copper conductors of each array 14,15 are sprayed with a glass frit slurry (see FIG. 4*c*), which is then dried; this slurry is then fired in an oven (see FIG. 4d) and caused to reflow to provide, when cooled, respective transparent dielectric coatings 16,17 which provide flat surfaces 18,19, respectively. The flat surfaces 18,19 are overlaid with a thin magnesium oxide coating (see FIG. 4**e), for reasons earlier described.

To fuse plates 10,11 into an integrated structure, unfused, heat-fusible sealing rods 20 of low-softening-point glass are placed in a window-frame pattern on surface 19 of lower plate 11. These rods 20 are of an identical diameter that is significantly greater than the precise preselected distance at which these plates are ultimately to be joined. As illustrated, two sets of identically sized upper and lower glass spacer rods 21,22 are then placed in overlaying relation in a two-stratum crisscross pattern within the border. The lower rods 22 extend parallel to, and are equidistantly spaced between, adjacent pairs of chrome-copper conductors in array 15 and rest on flat surface 19; whereas upper rods 21 overlay and rest on lower rods 22.

The upper plate 10 is now positioned over the lower plate 11 with upper plate surface 18 contacting sealing rods 20 and transversely positioned such that the upper spacer rods 21 extend parallel to, and equidistant from, but substantially below, pairs of adjacent chrome-copper conductors of array 14. Rods 21,22 have a significantly higher softening point than that of the sealing rods 20, and their combined height is substantially less than the diameter of the sealing rods. Hence, when the unfused assemblage of discrete parts is thereafter fired in a vacuum oven (see FIG. **4*f*) to a temperature sufficient to cause melting and reflow of the sealing material of rods 20, upper plate 10 will gradually settle from the position shown in FIG. 3 until surface 18 contacts upper spacer rods 21, as shown in FIG. 2. When the assemblage cools, the reflowed sealing material, designated 20' in FIG. 2, will fuse to the surfaces 18,19 of the respective dielectric layers 16,17 and thereby fuse plates 11 into an integrated structure having an impermeable chamber 23 sealed about its periphery by the material 20'. In accordance with conventional practice, this chamber 23 is now evacuated via an exhaust tube 24 (FIG. 1**), then charged with an illuminable gas at appropriate pressure; whereupon the tube is sealed to permanently entrap the gas within the chamber.

Figure 5:
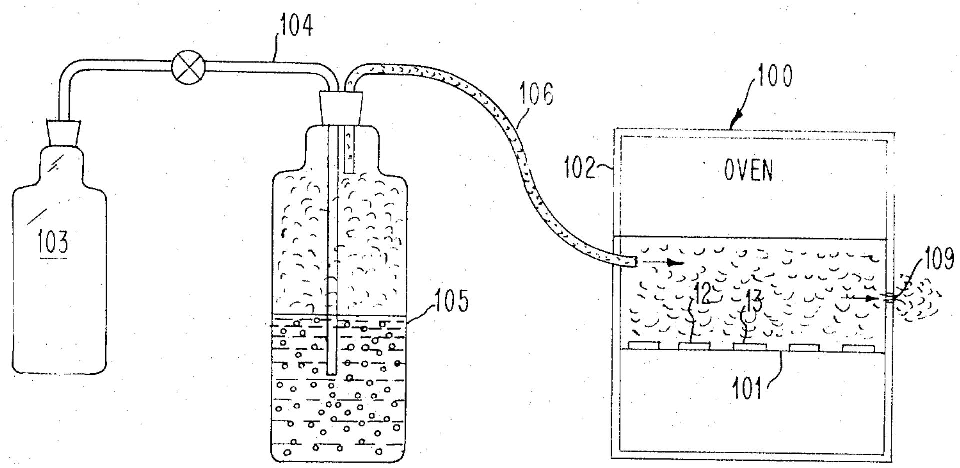
FIG. 5 is a schematic diagram of an apparatus for firing the assemblage in a wet atmosphere according to the method embodying the invention.

Applicants' improved method of making gaseous discharge devices of the type described differs from the teachings of the prior art, as exemplified by the cited related applications, in the following significant respects:

1. The conductor arrays 14,15 (see FIG. **4*a***) comprise merely a single 800A chrome layer Cr, which underlies the 10,000A copper layer Cu; i.e., no additional layer of chrome is required over the copper layer, although the presence of such an additional chromium top layer is not detrimental.
2. The special passivating step is eliminated. (Heretofore, as earlier noted, it was found necessary to heat the assemblage after the conductor pattern was etched and before the conductor array was sprayed with glass frit slurry; i.e., between steps *b* and *c* in FIG. 4. But with applicants' method, this is no longer necessary or desirable.)
3. The glass frit slurry is fired (see FIG. 4d) in a wet atmosphere devoid of reducing ambients in an oven 100 such as illustrated in FIG. 5. Substrates, such as 12,13, with their respective conductor arrays 14,15 covered with a spray of glass frit slurry, are supported on a suitable bed 101 within a suitably heated housing 102. A gas (such as air, argon, nitrogen or oxygen) which is devoid of reducing ambients is supplied under pressure from a source 103 through a conduit 104 to a tank 105 containing water. The conduit emits pressurized gas under the water level, causing a mixture of gas and water to be conveyed via a conduit 106 into oven 100 and thence exhausted through a suitable restricted opening 107 to cause the dielectric glass slurry to be fired in a wet atmosphere.

The unexpected benefits and results achieved by firing the dielectric glass slurry-coated assemblage in a wet atmosphere devoid of reducing ambients will now be described in greater detail and established by reference to the following tables:

TABLE I

Dielectric Glass Compositions (% By Weight)

| | A | B | C | D |
|---|---|---|---|---|
| PbO | 73.5 | 69.0 | 69.0 | 69.6 |
| $B_2O_3$ | 12.6 | 20.0 | 20.0 | 13.6 |
| $SiO_2$ | 13.7 | 11.0 | 7.8 | 13.6 |
| $Al_2O_3$ | 0.2 | — | 0.2 | 0.2 |
| MgO | — | — | 3.0 | 3.0 |
| Softening Temp. °C. | 475 | 498 | 530 | 547 |
| MgO Crazing Temp. °C. | 435 | 458 | 474 | 484 |

TABLE II

Firing Temperatures for Dielectric Glass Compositions

| | Composition | | | |
|---|---|---|---|---|
| Firing Temperature °C. | A | B | C | D |
| Dry Argon | 620 | 650 | 700 | 715 |
| Dry Nitrogen | 620 | 650 | 700 | 715 |
| Dry Air | 604 | 630 | 665 | 680 |
| Wet (70°F.) Argon | 585 | 590 | — | — |
| Wet (70°F.) Nitrogen | 582 | 596 | 620 | 630 |
| Wet (70°F.) Compressed Air | 570 | 575 | 609 | 619 |
| Wet (120°F.) Compressed Air | 560 | — | — | 620 |
| Wet (70°F.) Oxygen | 515 | 560 | 585 | 600 |

Table I specifies four dielectric glass compositions (designated A, B, C, D) and the respective temperatures at which they soften and at which magnesium oxide crazing occurs. Since the softening temperature is a function of the logarithm of a specific viscosity (7.6 poises), high viscosity glass compositions, like C and D, will have higher softening temperatures, and conversely. Also it will be noted that the temperature at which magnesium oxide crazing begins is desirably raised as the viscosity of the glass increases.

Referring now to Table II, it will be noted that the dielectric glass compositions A, B, C or D can be fired at significantly lower temperatures in a wet atmosphere than in a dry atmosphere. For example, composition B which must be fired at 630° C. in a dry air environment, can actually be fired at 560° C. (70° C. lower) in a wet oxygen environment; and for the higher viscosity glass compositions C and D, the firing temperature is reduced by 80° C. Note also that the firing temperatures increase as viscosity increases, but the reduction in firing temperature in a wet oxygen environment as compared to a dry air environment becomes more pronounced. As earlier noted, the magnesium oxide coating is applied (see FIG. 4*e*) after the dielectric glass is fired and reflowed (FIG. 4*d*); however, during the sealing operation (FIG. 4*f*), the assemblage must be heated in stages to a temperature approaching 500° C. If the dielectric glass starts to soften during the sealing step, it draws magnesium oxide into solution, causing the glass to craze like a mud field in a drought. However, with a high viscosity dielectric glass, such as composition C, the glass can be fired at less than 600° C. in a wet oxidizing environment; and crazing of the magnesium oxide during the subsequent sealing step will not commence unless and until the sealing temperature exceeds 474° C., thus minimizing the probability of crazing.

There is a second, quite unexpected, benefit from firing the dielectric glass in a wet atmosphere devoid of reducing ambients. It was found that when a dielectric glass, such as composition A, was sprayed as a slurry over chrome/copper/chrome conductors, dried and then fired in a wet nitrogen environment without the special passivation step of the prior art, wetting angles of 12°–20° were obtained; and when this slurry was sprayed over chrome/copper conductors 14,15 of the type herein disclosed, dried, then fired in a wet nitrogen environment, wetting angles of 10°–12° were observed--again without the special passivation step. This established the fact that the preconditioning step could be eliminated, and the extra chrome overlayer heretofore proposed could also be eliminated. By contrast, when chrome/copper/chrome (800A/10,000A/800A) conductors of the prior art were sprayed with a similar dielectric composition, dried, then passivated in forming gas, followed by firing of the dielectric, wetting angles of 50°–90° were observed. Wetting angles should be as small as possible in order to assure flat and smooth surfaces 18,19 on the dielectric layers 16,17. These surfaces should be flat to maintain the gap constant between the plates 10,11 and thereby assure consistent illumination characteristics when particular coordinate pairs of conductors are energized.

Actually it has been found that, when the dielectric is fired in a wet atmosphere, the chromium in the 800A layer Cr adjacent the substrate diffuses through the 10,000A copper layer Cu and reaches the exposed surface of the conductor to form a chromium oxide film that protects the conductors during subsequent high temperature operations, such as sealing. Thus, the two-layer Cr/Cu conductor becomes overcoated with a protective $CrO_3$ film during wet firing. Note that the water provides the necessary oxygen if the dielectric glass is fired in a wet nitrogen environment; however, in a wet nitrogen environment, the film will contain chromium nitride as well as chromium oxide.

Elimination of the overlayer of the chrome from the conductors obviously saves the cost of the chrome layer itself. But it also desirably permits purchase and use of dielectric glass already overcoated with a chrome layer Cr, to which the copper layer Cu may be applied in a nonvacuum environment with resultant cost savings. By contrast, chrome layers must be deposited in a vacuum environment, obviously requiring greater investment in equipment and supervision.

It will thus be seen that the firing temperatures of dielectric glass have been lowered as much as 80° C. in a very wet oxygen atmosphere. Moreover, the reductions in firing temperature become progressively greater as the environment becomes more oxidized. Furthermore, increasing the temperature of the ambient atmosphere within the oven will increase the vapor pressure and provide some additional lowering of the firing temperature (see Table II which shows that the firing temperature of composition A is reduced 10° C. when the temperature of a wet compressed air environment is increased from 70° F. to 120° F.). Thus, best results are achieved with a very wet atmosphere; the wetter, the better.

In conclusion, it should be noted that wet firing does not provide these desirable results with all dielectric glass frits; for example, those that are alkaline, such as those containing significant quantities of zinc oxide or aluminum oxide. It should also be noted that the specific dielectric glass formulations A, B and C form no part of the present invention per se; these are merely some that are being developed and optimized to maximize the softening temperature. The invention is concerned with the improvement (i.e., reduction) in firing temperatures and other benefits achieved when any of these dielectrics is fired in wet atmospheres devoid of reducing ambients.

It is to be understood that only those features of applicants' improved method which are required for an understanding of the present invention have been described in detail; and except as herein indicated, the method follows that taught in the prior art, such as the above-cited applications.

While the preferred method of practicing the invention has been shown and described, it will be understood that various substitutions and changes in the detailed steps in said method may be made by those skilled in the art without departing from the spirit and scope of the invention. Accordingly, the method herein disclosed for making gaseous discharge display and/or memory devices is to be considered merely as illustrative, and the scope of the invention is to be limited only as specified in the claims.

What is claimed is:

1. In a method of making a gaseous discharge device, the steps of forming an array of conductors on a flat glass substrate, spraying a slurry comprising a finely ground glass frit on the substrate as a dielectric to cover the conductors thereon with such slurry, drying the slurry, and firing the resultant assemblage in an oven in a wet atmosphere substantially devoid of reducing ambients to cause the glass frit dielectric to reflow at a temperature at least 20° C. lower than that at which the frit would reflow in an identical but dry atmosphere so as to substantially reduce the possibility of warpage of the substrate during such firing and cause the dielectric, upon cooling, to adhere to the substrate and conductors to form a glass plate having a protective dielectric coating of uniform depth.

2. The method according to claim 1, wherein the temperature required to achieve firing of the assemblage reduces progressively, for a given dielectric, as the ambients in the wet atmosphere become more oxidizing.

3. The method according to claim 1, wherein the temperature required to achieve firing of the assemblage reduces as the temperature of the wet atmosphere and its degree of wetness increase.

4. The method according to claim 1, wherein said assemblage is fired at a temperature significantly above normal room temperature, and the wet ambient atmosphere is provided by a gas supplied to the oven at a temperature somewhat above normal room temperature, whereby firing may be achieved at a temperature lower than if said gas were supplied at normal room temperature.

5. The method according to claim 1, wherein the atmosphere is a wet compressed air atmosphere, and said assemblage is fired at a termperature more than 30° C. below that which would be required to fire said assemblage in dry air.

6. The method according to claim 1, wherein the atmosphere is a wet oxygen atmosphere, and the assemblage is fired at a temperature more than 50° C. below that which would be required to fire the assemblage in a dry air environment.

7. The method according to claim 1, including the steps of depositing in a vacuum environment a magnesium oxide coating over the dielectric after the firing step, and then firing a pair of such plates with their conductor arrays orthogonally disposed and sealed with a sealing glass a predetermined distance apart to form a chamber there-between for receiving an illuminable gas, said dielectric being of high viscosity glass that in a dry atmosphere would have to be fired at a temperature that would warp the substrate but which in said wet atmosphere is fired at a sufficiently lower temperature to avoid such warpage, the probability of crazing of the magnesium oxide coating being minimized by use of such high viscosity glass.

8. In a method of making a gaseous discharge device, the steps of depositing a layer of chromium on a glass substrate, depositing a layer of copper over the chromium layer, etching in the resultant assembly a predetermined pattern of chrome/copper conductors, spraying a dielectric glass frit over the copper layer of the etched conductors, drying the resultant assemblage, and firing the assemblage in an oven in a wet atmosphere essentially devoid of reducing ambients to cause the glass frit dielectric to reflow to form, when cooled, a glass plate having a protective dielectric coating of uniform depth, and concurrently cause the chromium layer to diffuse through the copper layer and form on the exposed surface of the conductors a protective chromium oxide film.

9. The method according to claim 8, wherein said assemblage is fired at a temperature at least 20° C. below that which would be required to fire said dielectric in a dry atmosphere.

10. The method of claim 8, wherein the atmosphere is a wet nitrogen atmosphere, the water in the wet atmosphere providing the oxygen for forming the chromium oxide, and the nitrogen combining with the chromium to also provide chromium nitride in said film.

11. The method according to claim 8, wherein firing the dielectric in a wet atmosphere provides wetting angles between said conductors and dielectric of not more than about 12°.

* * * * *